(12) United States Patent
Lundeen

(10) Patent No.: US 10,747,510 B1
(45) Date of Patent: Aug. 18, 2020

(54) APPLICATION RUNTIME MODIFICATION

(71) Applicant: Apptimize LLC, San Francisco, CA (US)

(72) Inventor: Timothy D. Lundeen, San Francisco, CA (US)

(73) Assignee: Apptimize LLC, San Francisco, CA (US)

( * ) Notice: Subject to any disclaimer, the term of this patent is extended or adjusted under 35 U.S.C. 154(b) by 0 days.

(21) Appl. No.: 16/431,000

(22) Filed: Jun. 4, 2019

(51) Int. Cl.
*G06F 9/44* (2018.01)
*G06F 8/41* (2018.01)
*G06F 8/71* (2018.01)
*G06F 8/30* (2018.01)
*G06F 8/65* (2018.01)

(52) U.S. Cl.
CPC .................. *G06F 8/44* (2013.01); *G06F 8/30* (2013.01); *G06F 8/65* (2013.01); *G06F 8/71* (2013.01)

(58) Field of Classification Search
CPC ..... G06F 8/44; G06F 8/30; G06F 8/65; G06F 8/71
See application file for complete search history.

(56) References Cited

U.S. PATENT DOCUMENTS

| | | | | |
|---|---|---|---|---|
| 7,984,429 B2 * | 7/2011 | Hunt | ....................... | G06F 9/465 717/130 |
| 8,646,050 B2 * | 2/2014 | Vidrine | .................. | G06F 21/57 726/4 |
| 2008/0222618 A1 * | 9/2008 | Valtchev | ................. | G06F 9/542 717/139 |
| 2014/0325193 A1 * | 10/2014 | Singh | .................. | G06F 11/3471 712/228 |
| 2017/0017528 A1 * | 1/2017 | Hua | ........................ | G06F 9/542 |
| 2018/0089440 A1 * | 3/2018 | Fiedler | ...................... | G06F 8/47 |

OTHER PUBLICATIONS

Title: Deli: A new run-time control point author: G Desoli, published on 2002.*
Title: DIOTA: Dynamic instrumentation, optimization and transformation of applications author: J Maebe, published on 2002.*

* cited by examiner

*Primary Examiner* — Chameli Das
(74) *Attorney, Agent, or Firm* — Fenwick & West LLP

(57) ABSTRACT

Techniques to facilitate modifications to program execution in an application at runtime are disclosed herein. In at least one implementation, a copy of a code block associated with code is created. A flag associated with the copy of the code block is modified to mark the copy of the code block as having a native code version of the code. Metadata associated with the copy of the code block is modified to identify alternative code to run instead of the native code version of the code. A pointer associated with the code block is modified to point to a trampoline function. The trampoline function checks whether the code block is associated with a modification, and when the code block is associated with the modification, then the trampoline function calls the copy of the code block to invoke the alternative code by virtue of the flag and the metadata.

20 Claims, 7 Drawing Sheets

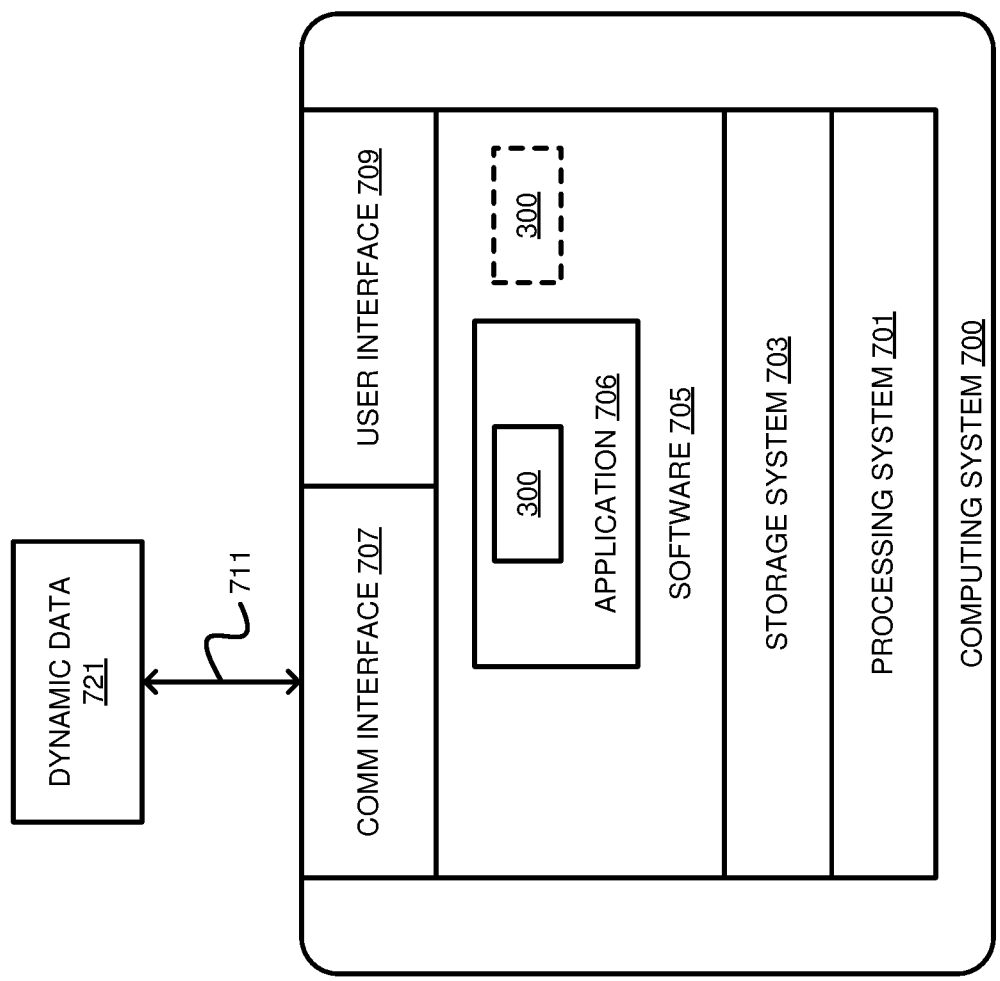

APPLICATION RUNTIME MODIFICATION

TECHNICAL BACKGROUND

Modern computing systems such as smartphones, tablets, and other mobile devices enable users to install and run various applications. These mobile applications typically provide a wide range of functionality, such as streaming video, social networking, games, email, instant messaging, weather, navigation, or any other mobile application.

Computing systems are capable of executing various types and formats of program instruction code associated with an application, including native code and bytecode versions. Native code may be defined as computer programming instructions that are compiled to run on a particular processor and its instruction set. When executed on its native processor, native code requires no additional processing or interpretation in order to run. As such, an application may be referred to as "native" to a particular computing system when the application program code has been developed and/or compiled such that it is executable by a processor of the computing system without requiring an interpreter or any other translation. Bytecode, also known as portable code, is a more generic form of program instructions designed for execution by a software interpreter. A bytecode program may be executed by parsing and directly executing the instructions individually, line by line. Bytecode programs may be processed and compiled into native code implementations for specific processors and instruction sets to improve efficiency and execution speed.

In various runtime environments, it is possible to modify how a method, function, class, or other such software component maps to the actual code implementation of the component. Sometimes referred to as swizzling, such re-mapping technology allows code associated with one function to be replaced by code associated with another function. This may be useful in the context of making modifications to a user interface of an application, for example. Some implementations of re-mapping technology involve modifying the value of a pointer that points to a location in memory where a method is implemented in code. By changing the value of the pointer, the method can be made to point to other code such that, when the method is called, a different method is employed in its place. The target method that is called in place of the original method is sometimes referred to as a callback function. Such techniques may enable a software development kit (SDK) to make modifications to an application without altering the main program code of the application.

OVERVIEW

Provided herein are techniques to facilitate modifications to program execution in an application at runtime. In at least one implementation, a copy of a code block associated with code is created. A flag associated with the copy of the code block is modified to mark the copy of the code block as having a native code version of the code. Metadata associated with the copy of the code block is modified to identify alternative code to run instead of the native code version of the code when the native code version of the code is invoked. A pointer associated with the code block is modified to point to a trampoline function instead of an original address, wherein, when the pointer associated with the code block is accessed, the trampoline function is invoked instead of the original address by virtue of the pointer modification. The trampoline function checks whether the code block is associated with a modification, and when the code block is associated with the modification, then the trampoline function calls the copy of the code block to invoke the alternative code by virtue of the flag and the metadata.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

FIG. 7 is a block diagram that illustrates a computing system.

DETAILED DESCRIPTION

Figure 1:
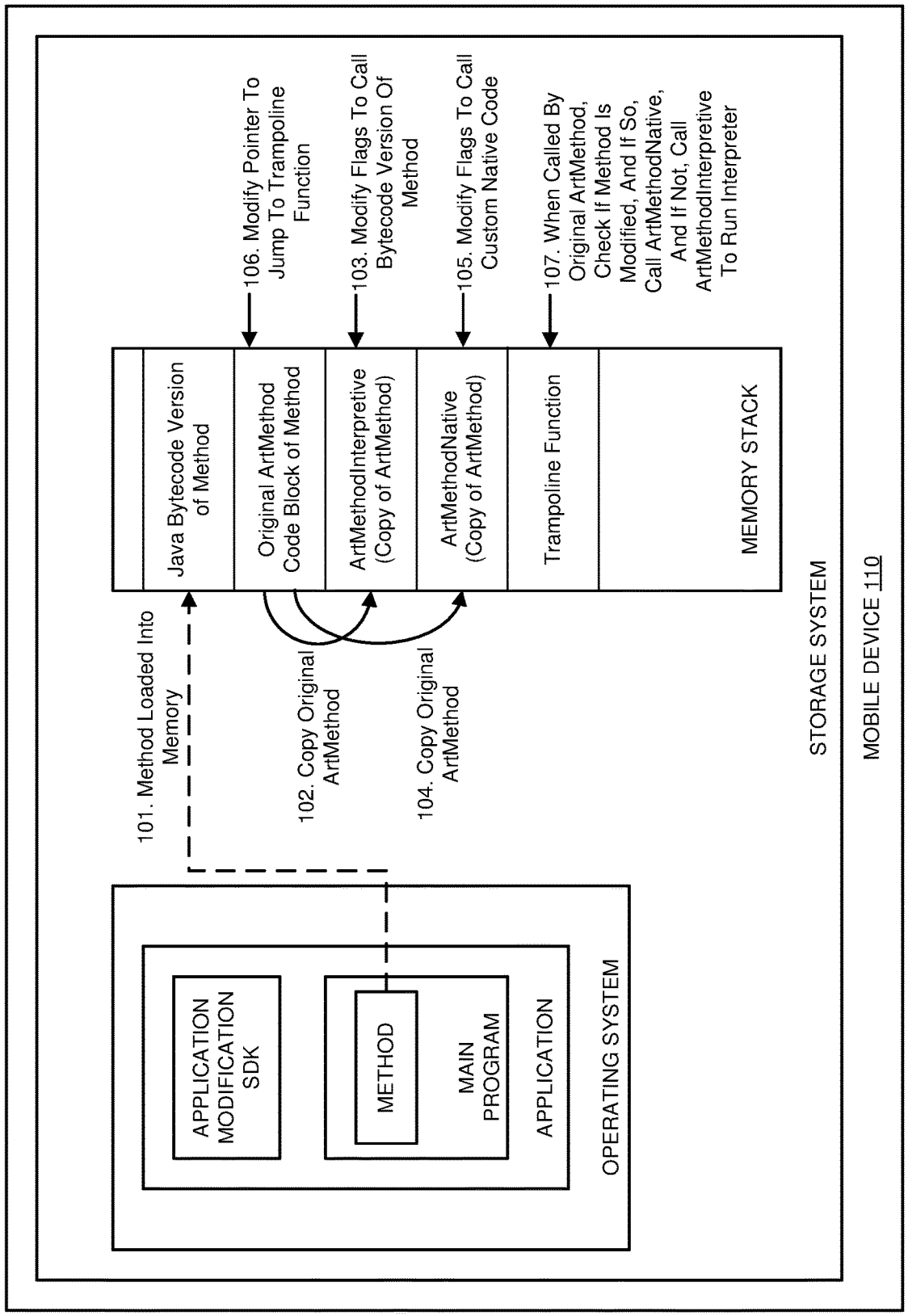
FIG. 1 is a block diagram that illustrates a process flow in an exemplary embodiment.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Mobile application designers often desire to make changes and updates to visual elements and other aspects of the user interface of an application. Ordinarily, such changes would require the application developers to edit program code to implement the new application design requirements. However, a framework can be installed into a mobile application which can receive and interpret changes to visual properties of display elements, providing a quick and easy way for designers to edit the user interface of a mobile application without having to write any programming code. Such changes and new features can then be tested on subsets of the user base using various techniques such as A/B testing, staged rollouts, and feature toggling. In order to achieve some of this functionality, the framework may need to intercept, or swizzle, various functions of the application. For example, the framework may utilize a software development kit (SDK) that employs swizzling techniques to intercept calls to certain functions and run different code instead of or in addition to the hooked function. In the Android® Runtime (ART) environment, applications are commonly written in Java® and compiled to bytecode for interpretation by the Java virtual machine. Thus, when the SDK employs swizzling on a function of an application designed to run on the ART environment, the Java bytecode of that function may be manipulated to implement the swizzling.

The Android operating system now includes just-in-time (JIT) translation of Java bytecode to native machine processor code on a method-by-method basis. JIT translation is triggered when a Java bytecode method is called frequently during runtime, which causes the method to be queued and then translated into native machine code. Once translated, the ART switches to using the native machine processor code instead of interpreting the Java bytecode for any subsequent calls to that method. Unfortunately, although the JIT translation to native machine code provides an optimization over using the Java bytecode, if a Java method was swizzled as described above, the intended effects of the swizzling will not be achieved if the native machine code version of the method generated through JIT translation is allowed to run instead.

Due to memory manipulation and other modifications to call processing and program flow, some techniques used to implement swizzling can result in memory access errors and stack violations which can lead to system crashes. Further, on systems with processors that utilize multithreading, similar stack errors and crashes may occur if a thread accesses a location in memory while that same area of memory is being modified in another thread to implement swizzling on a method. In addition, the JIT translation of swizzled Java methods can disrupt the operation of the swizzling if not handled appropriately, as discussed above. The following disclosure provides various techniques for runtime modification of application methods and other functions on which swizzling has been employed, while avoiding memory access errors, stack violations, and system crashes and still allowing JIT translations to occur without affecting the swizzling.

Systems, methods, and software are disclosed herein that enhance application development and software design-for-test (DFT) technology utilizing an application development and optimization platform to facilitate modifications to program execution in an application at runtime. Among other benefits, the techniques described herein provide an application developer the ability to alter the visual appearance and other attributes of elements in a user interface of an application at runtime, without causing memory errors or system crashes in the process.

Figure 2:
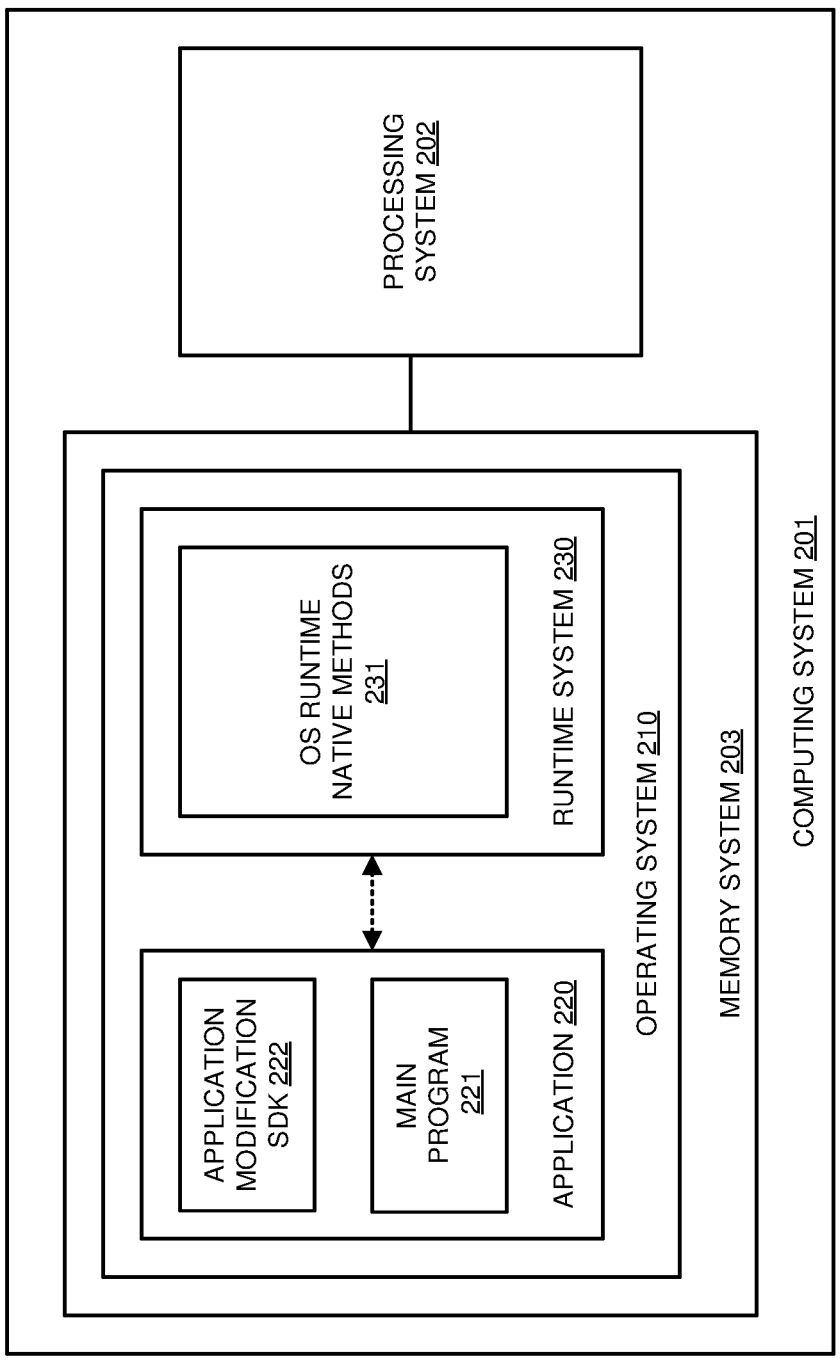
FIG. 2 is a block diagram that illustrates a computing system.
Figure 3:
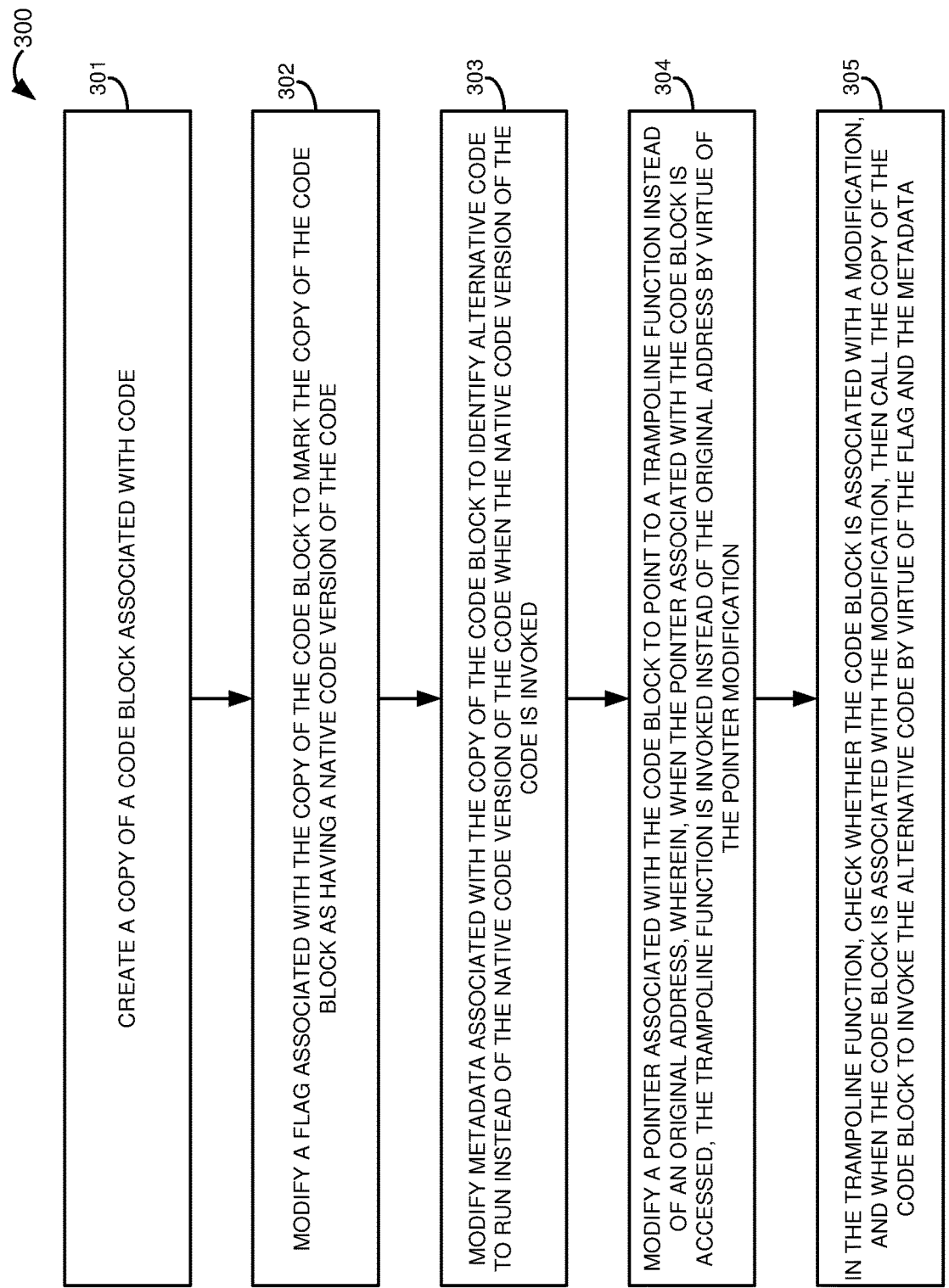
FIG. 3 is a flow diagram that illustrates an operation of a computing system in an exemplary embodiment.
Figure 4:
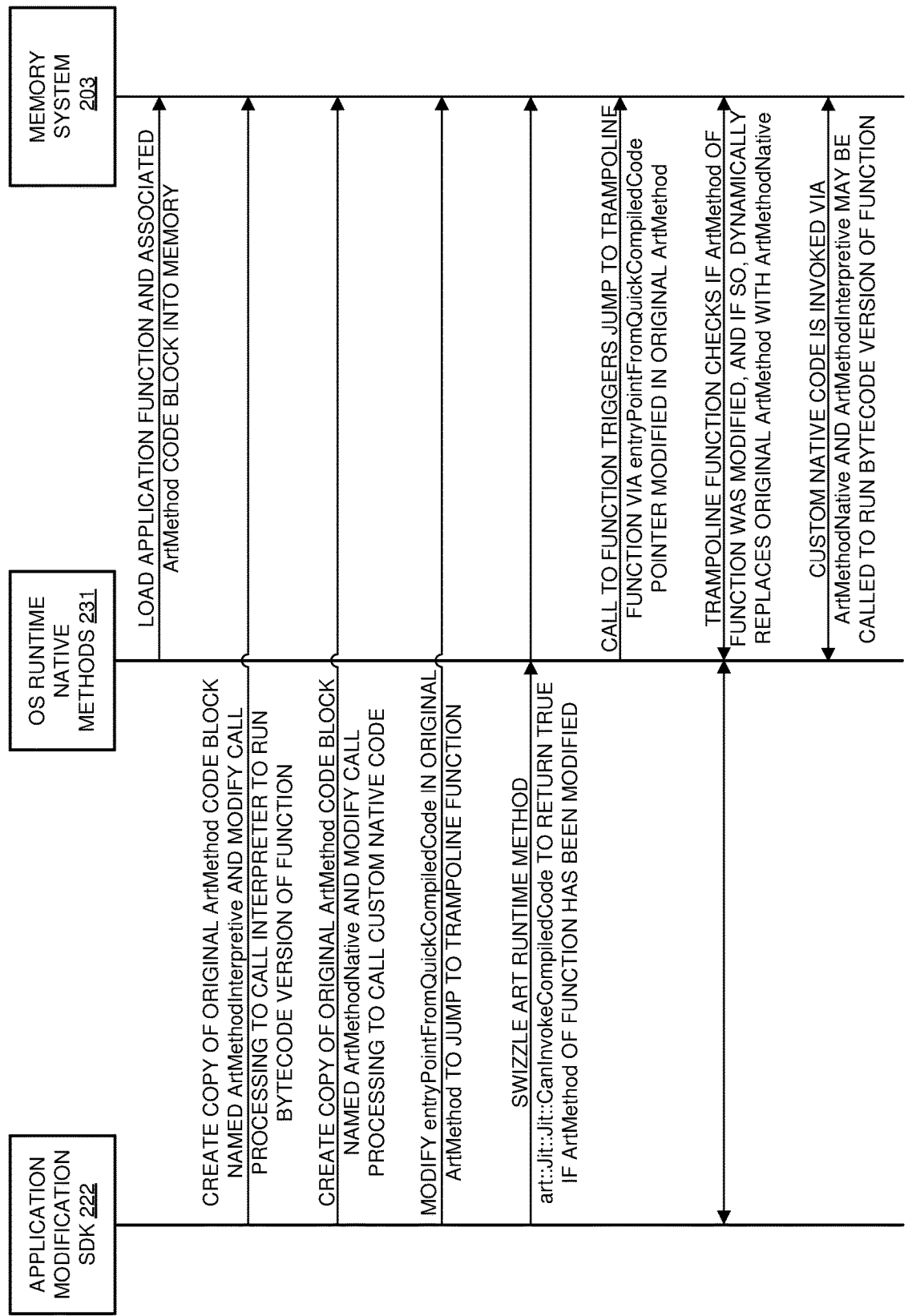
FIG. 4 is a sequence diagram that illustrates an operation of a computing system in an exemplary embodiment.
Figure 5:
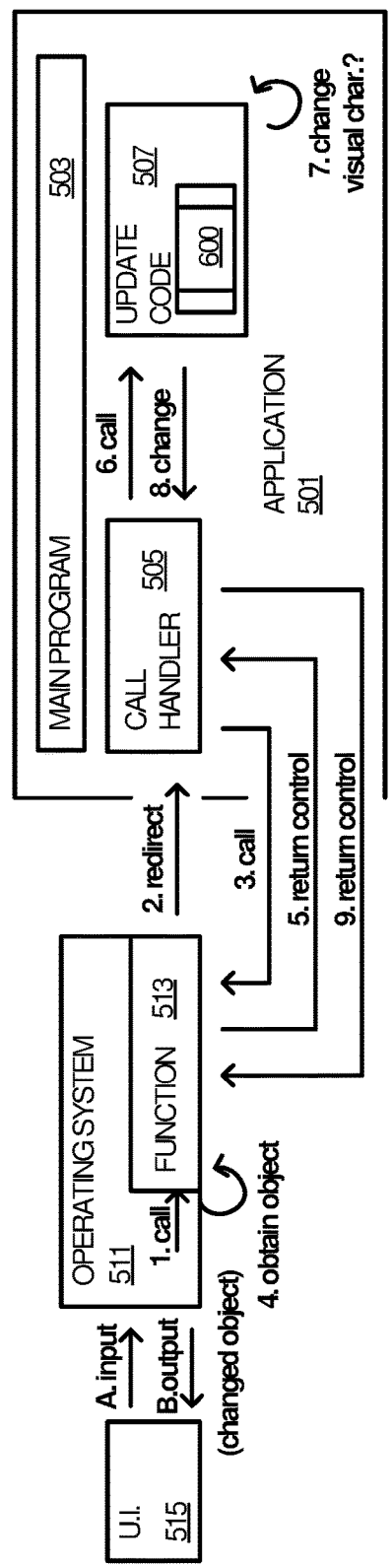
FIG. 5 is a block diagram that illustrates an implementation of dynamic user interface modification in an exemplary embodiment.
Figure 6:
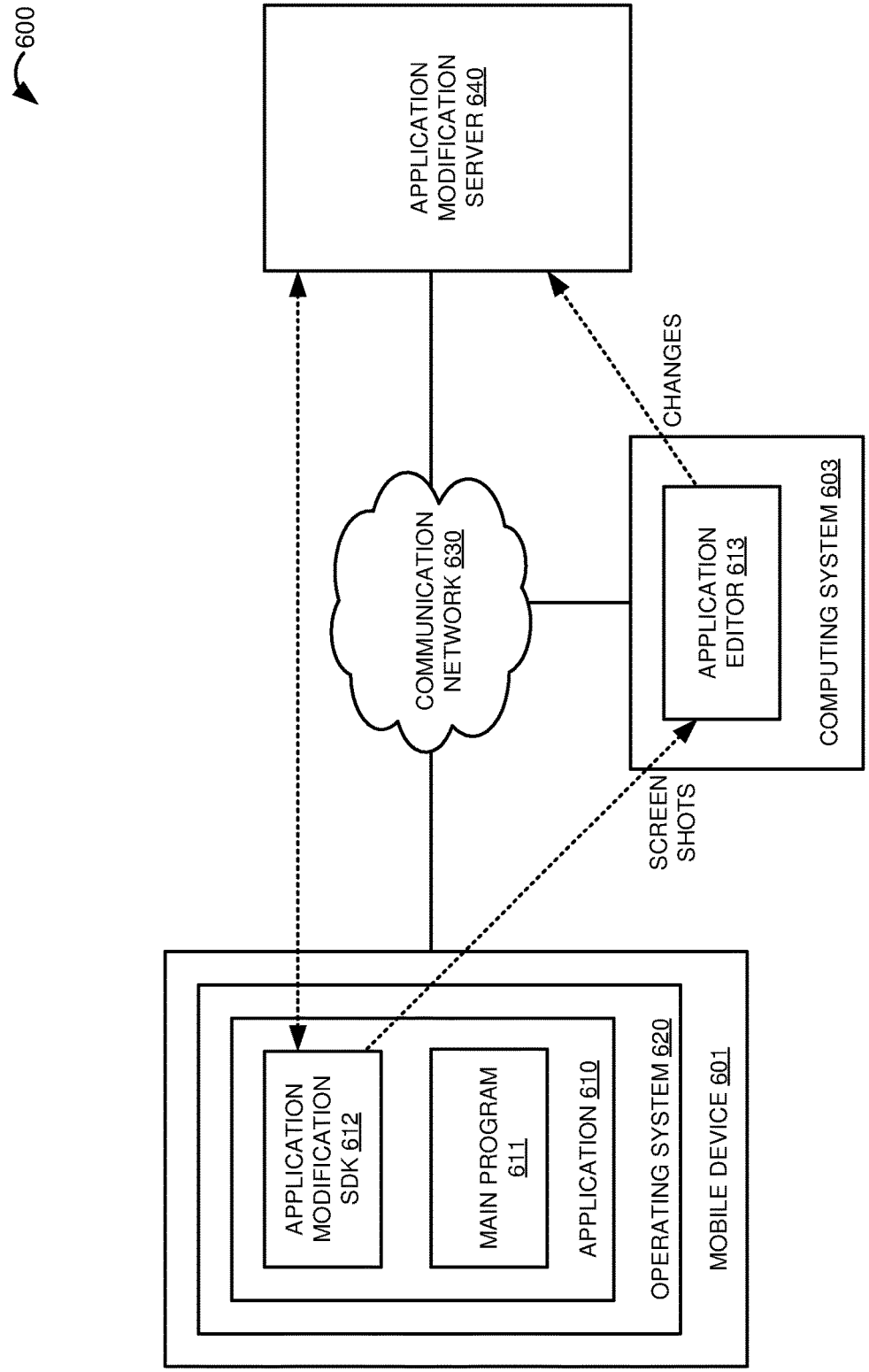
FIG. 6 is a block diagram that illustrates a communication system.

Referring now to the drawings, FIG. 1 illustrates a process flow of a technique to execute customized code in place of a method in an exemplary embodiment. FIG. 2 illustrates an exemplary computing system, while FIGS. 3 and 4 illustrate operations of the computing system in exemplary embodiments. FIG. 5 illustrates an implementation of dynamic user interface modification in an exemplary embodiment. FIG. 6 illustrates a communication system that may be utilized to implement customizations of visual elements and other features of an application in an exemplary embodiment, while FIG. 7 illustrates an exemplary computing system that may be used to perform any of the techniques, processes, and operational scenarios described herein.

Turning now to FIG. 1, an exemplary process flow that provides for runtime modification of a Java application method is illustrated. The steps of the process flow are labeled 101 through 107. In this example, the process flow describes the execution of program code on mobile device 110. Mobile device 110 comprises a storage system on which an operating system (OS) is installed. In this example, the OS installed on mobile device 101 comprises an Android operating system, which includes an Android Runtime (ART) application runtime environment with ART native methods. A mobile application is installed on the operating system that includes main program code having several different application methods, although only one method of the application is shown in FIG. 1 for clarity. In this example, the method is initially provided from the application package as Java bytecode for execution by the interpreter.

Referring now to the process flow of FIG. 1, initially the Java bytecode version of the method is loaded into memory, as shown in step 101. Note that most or all of the application would typically be loaded into memory upon execution of the application, but only the method at issue here is shown in the memory stack of FIG. 1 for clarity. Methods executing in the ART environment are represented by an ArtMethod object at runtime. An ArtMethod code block comprises a runtime structure that provides information for the interpreter and the native code runtime to call the method, including references to the location of the bytecode version of the method in memory and pointers to various call entry points. Accordingly, the original ArtMethod code block of the method is also present in the memory stack during runtime, as shown in FIG. 1.

The original ArtMethod code block of the method is copied into the memory stack and stored as a new object called ArtMethodInterpretive, as shown in step 102. In step 103, flags are marked and metadata and other call processing code of ArtMethodInterpretive are modified to call the interpreter to run the Java bytecode version of the method. The modifications to ArtMethodInterpretive ensure that any subsequent calls to ArtMethodInterpretive will cause the Java bytecode version of the method to run on the interpreter, instead of a native machine code version of the method which may exist due to JIT translation optimization or otherwise.

In step 104, the original ArtMethod code block of the method is once again copied into the memory stack, this time stored as another new object called ArtMethodNative. In step 105, flags are marked and metadata and other call processing code of ArtMethodNative are modified to call custom native code. For example, in at least one implementation, the ArtMethodNative copy of the ArtMethod code block may be modified to call a Java Native Interface (JNI) method that is configured to call the bytecode version of the swizzled method via the modified ArtMethodInterpretive code block, and can take other actions as appropriate. In some implementations, the modifications to the ArtMethodNative copy of the ArtMethod code block may include setting a flag in ArtMethodNative to mark the ArtMethodNative code block as having a native code version of the method, and also modifying metadata in the ArtMethodNative block to identify the custom JNI method that should be run instead of the actual native code version of the method when the native code version of the method is invoked via ArtMethodNative.

In step 106, the original ArtMethod's entryPointFromQuickCompiledCode pointer is modified to jump to a custom trampoline function. This modification ensures that any calls to run the method via the original ArtMethod code block are instead routed to the custom trampoline function for call handling. In addition, in at least one implementation, the ART runtime method art::Jit::Jit::CanInvokeCompiledCode is modified at runtime, or swizzled, to instead run alternative call handling code. Further, in some implementations, an application modification SDK installed into the mobile application could keep track of which ArtMethod blocks are associated with methods of the application that have been swizzled in a list of swizzled methods, which may return a Boolean value indicating whether or not a particular method is included in the list. Accordingly, in the swizzled art::Jit::Jit::CanInvokeCompiledCode ART runtime method, the parameter sent to the art::Jit::Jit::CanInvokeCompiledCode method could be checked against this list of swizzled ArtMethod code blocks to determine whether or not the parameter is among the swizzled ArtMethods, and a value of 'true' is returned if so. Otherwise, if the parameter is not in the list of swizzled ArtMethods, the method is allowed to run normally.

At step 107, when the trampoline function is called via the modified entryPointFromQuickCompiledCode in the original ArtMethod, a check is made to determine if the called method is associated with the modifications described above. For example, in at least one implementation, an application modification SDK installed on the mobile application could keep track of which methods of the application have been modified, or swizzled, in a map or list of swizzled methods, which may return a Boolean value indicating whether or not a particular method is included in the list. Accordingly, when the custom trampoline function is called, the trampoline function could query the list of swizzled application methods with the called method. If the called method appears in the list or is otherwise associated with a modified ArtMethod, the trampoline function dynamically changes the called method to the associated ArtMethodNative and jumps to the entryPointFromQuickCompiledCode in the ArtMethodNative code block that was modified in step 104 to call the custom native code. The custom JNI method then runs in place of the actual native code version of the method, which could take any desired actions and make various changes to user interface elements and other runtime modifications, and may also call the Java bytecode version of the method by calling the corresponding ArtMethodInterpretive code block that is configured to call the interpreter and run the method's Java bytecode. In the alternative, if the called method does not appear in the list of swizzled application methods or is otherwise not associated with any modifications, then the trampoline function jumps to the artQuickToInterpreterBridge to call the interpreter to run the original Java bytecode of the called method.

The runtime modification techniques described above provide a more robust way of swizzling a Java method in the ART runtime environment. By creating the ArtMethodNative copy of the ArtMethod code block and modifying that copy instead of the original ArtMethod, system crashes due to memory access errors and stack violations may be prevented. For example, if the original ArtMethod is loaded onto a Java stack somewhere in memory, that stack remains valid and will not crash when it returns through the ArtMethod or tries to take a stack trace. Further, if the original ArtMethod was optimized via the JIT compiler, the original ArtMethod is still valid, except that due to the modification to the original ArtMethod's entryPointFromQuickCompiledCode pointer, the ArtMethod now jumps to the custom trampoline function for call handling instead of calling the optimized native code generated by the JIT compiler. Thread safety is also ensured with the above technique, because the changes to the ArtMethodInterpretive and ArtMethodNative copies of the original ArtMethod occur prior to setting the entryPointFromQuickCompiledCode pointer in the original ArtMethod to jump to the custom trampoline function. Accordingly, no stack errors or crashes will occur on multithreading systems, since the problem of a thread potentially accessing a location in memory while that same area of memory is being modified in another thread is averted by modifying the copies of the ArtMethod prior to setting the entryPointFromQuickCompiledCode pointer in the original ArtMethod. Another computing system that may be used to implement the techniques described herein will now be discussed with respect to FIG. 2.

FIG. 2 illustrates a block diagram of computing system 201. Computing system 201 comprises processing system 202 and memory system 203. Processing system 202 is operatively coupled with memory system 203. Memory system 203 stores operating system 210, application 220, runtime system 230, and OS runtime native methods 231. Application 220 includes main program code 221 and application modification software development kit (SDK) 222. OS runtime native methods 231 are loaded by runtime system 230 and may include shared-object libraries, just-in-time (JIT) translation functions, and other runtime system methods. In at least one implementation, runtime system 230 could comprise an Android® Runtime (ART) environment.

In operation, processing system 202 retrieves program code for operating system 210, application 220, and runtime system 230 from memory system 203, and upon retrieval, processing system 202 loads and executes operating system 210, application 220, and runtime system 230 using available memory space of memory system 203. Upon execution, runtime system 230 loads OS runtime native methods 231. Exemplary operations of computing system 201 to facilitate modifications to program execution in an application at runtime will now be discussed with respect to FIGS. 3 and 4.

FIG. 3 is a flow diagram that illustrates an operation of computing system 201 in an exemplary implementation. The operation 300 shown in FIG. 3 may also be referred to as runtime modification process 300 herein. The steps of the operation are indicated below parenthetically. The following discussion of operation 300 will proceed with reference to elements of computing system 201 of FIG. 2 in order to illustrate its operations, but note that the details provided in FIG. 2 are merely exemplary and not intended to limit the scope of process 300 to the specific implementation of FIG. 2.

Operation 300 may be employed by computing system 201 to facilitate modifications to program execution in an application at runtime. As shown in the operational flow of FIG. 3, application 220 directs computing system 201 to create a copy of a code block associated with code (301). In some implementations, application 220 could direct computing system 201 to create the copy of the code block in memory system 203. In at least one implementation, a control module installed into application 220, such as application modification SDK 222, may be configured to create the copy of the code block associated with the code. In some examples, the code could comprise an application method, such as a method associated with application 220 and/or main program code 221. In other examples, the code could comprise one or more runtime methods included in OS runtime native methods 231, an operating system method, function, or class associated with operating system 210, or any other program code. In some implementations, the code block associated with the code could comprise a runtime object associated with the code. For example, when the code is loaded into memory, the code may be represented by a runtime object code block at runtime. In some examples, the code block could comprise a runtime structure that provides information needed to call the code associated with the code block, including references to a location of a bytecode version of the code in memory and pointers to various call entry points associated with the code. In at least one implementation, the code may comprise a Java application method, and the code block could comprise an ArtMethod object that represents the Java application method.

Application 220 directs computing system 201 to modify a flag associated with the copy of the code block to mark the copy of the code block as having a native code version of the code (302). In at least one implementation, a control module installed into application 220, such as application modification SDK 222, may be configured to modify the flag associated with the copy of the code block to mark the copy of the code block as having the native code version of the code. In some examples, multiple versions of the code may exist, such as the native code version of the code, a more general bytecode version that requires an interpreter to run, and any other code variants, and the runtime system 230 may keep track of which version to run by utilizing a flag within the code block associated with the code. In at least some implementations, when the flag is set to true, the flag indicates that a native machine code version of the code exists, and the code block representing the code may also contain a reference to an address where the corresponding native code version is stored in memory. In some implementations, the native machine code version of the code may be generated during runtime by a JIT translation mechanism in the OS runtime native methods 231 that translates the bytecode version of the code into the native code version. In this case, the JIT translation of the bytecode version of the code into the native machine code version could cause the flag of the code block associated with the code to be set by the JIT translation mechanism as having a native code version of the code, so that the copy of the code block would then already have this native code flag set as well.

Application 220 directs computing system 201 to modify metadata associated with the copy of the code block to identify alternative code to run instead of the native code version of the code when the native code version of the code is invoked (303). In at least one implementation, a control module installed into application 220, such as application modification SDK 222, may be configured to modify the metadata associated with the copy of the code block to identify the alternative code to run instead of the native code version of the code when the native code version is invoked. In some implementations, the metadata comprises call processing code included within the copy of the code block that is modified to identify the alternative code to run instead of the native code version of the code. For example, the metadata associated with the copy of the code block could include a pointer or reference to the native code version of the code, and this pointer could be dynamically changed in memory at runtime to instead point to the alternative code to run in place of the native code. Accordingly, in at least one implementation, modifying the metadata associated with the copy of the code block to identify the alternative code to run instead of the native code version of the code when the native code version of the code is invoked could comprise modifying a pointer associated with the copy of the code block to point to the alternative code instead of the native code version of the code.

Application 220 directs computing system 201 to modify a pointer associated with the code block to point to a trampoline function instead of an original address, wherein, when the pointer associated with the code block is accessed, the trampoline function is invoked instead of the original address by virtue of the pointer modification (304). In at least one implementation, a control module installed into application 220, such as application modification SDK 222, may be configured to modify the pointer associated with the code block to point to the trampoline function instead of the original address. For example, a pointer or reference in the original code block associated with the code may be dynamically modified in memory at runtime to point to the trampoline function instead of an original address. In some implementations, the pointer that is modified in the original code block could comprise an entry point to the code, such as an entry point to the native machine code version of the code, and the native code version may be stored at the original address. Thus, by modifying the pointer to point to the trampoline function instead of the native code version of the code, when the native code version of the code is called by referencing the pointer in the code block, the trampoline function is invoked instead of the native code stored at the original address by virtue of the pointer modification. In some implementations where the code block comprises an ArtMethod object representing a Java application method at runtime, the pointer associated with the code block that is modified to point to the trampoline function may comprise an entryPointFromQuickCompiledCode in an ART runtime environment. Further, in at least one implementation, modifying the metadata associated with the copy of the code block to identify the alternative code to run instead of the native code version of the code occurs prior to modifying the pointer associated with the code block to point to the trampoline function instead of the original address, which provides multithreading safety and helps avoid memory stack violations and crashes.

Application 220 directs computing system 201 to, in the trampoline function, check whether the code block is associated with a modification, and when the code block is associated with the modification, then call the copy of the code block to invoke the alternative code by virtue of the flag and the metadata (305). In at least one implementation, a control module installed into application 220, such as application modification SDK 222, could include the trampoline function, and as such the control module may be configured to execute the trampoline function to check whether the code block is associated with a modification, and when the code block is associated with the modification, then call the copy of the code block to invoke the alternative code by virtue of the flag and the metadata. In some examples, the modification associated with the code block could comprise any change made to the code block and/or the code associated with the code block, an indication of the code block in a list of modified code blocks, the existence of a copy of the code block, or any other modification associated with the code block and/or the code. For example, in at least one implementation, the modification associated with the code block could comprise the pointer modification associated with the code block that points to the trampoline function instead of the original address. In some implementations, a control module such as SDK 222 or some other system function may keep track of which code blocks have been modified, and the trampoline function could query the list with an indication of the code block to check whether the code block is associated with a modification, which could return a Boolean value of 'true' or 'false'. Other techniques of checking whether the code block is associated with a modification are possible and within the scope of this disclosure.

Regardless of how the check is made, if the trampoline function determines that the code block is associated with a modification, then the trampoline function calls the copy of the code block to invoke the alternative code by virtue of the flag and the metadata. In other words, due to setting the flag associated with the copy of the code block to mark the copy of the code block as having a native code version of the code, and modifying the metadata associated with the copy of the code block to identify the alternative code to run instead of the native code version of the code, when the copy of the code block is called, the native code flag would ordinarily cause the native code version of the code to be invoked, but due to the metadata modification, the alternative code is invoked instead of the native code version of the code. However, if the trampoline function determines that the code block is not associated with a modification, then an interpreter is called to run an original bytecode version of the code.

In the case where the trampoline function determines that the code block is associated with a modification and responsively calls the copy of the code block to invoke the alternative code by virtue of the flag and the metadata, then the alternative code runs and may perform several actions. In some implementations, among other actions, the alternative code could call the bytecode version of the code to run on an interpreter. For example, in at least one implementation, a second copy of the code block associated with the code could be created, and second metadata associated with the second copy of the code block could be modified to invoke a bytecode version of the code when the second copy of the code block is called. Accordingly, when the alternative code is invoked, the alternative code could call the second copy of the code block to invoke the bytecode version of the code by virtue of the second metadata. In at least one implementation, control then returns to the alternative code after the bytecode version of the code executes. The alternative code may then perform any other desired operations. In some implementations, when the bytecode version of the code executes, the bytecode version of the code retrieves an object for display in a user interface of the application, and upon receiving control back after the bytecode version of the code executes, the alternative code changes a characteristic of the object prior to display in the user interface of the application. In some examples, the object may comprise any visual element displayed in a user interface of application 220, and the characteristic of the object that is changed prior to display in the user interface could comprise any visual alteration to the object, such as modifications to image properties, including replacing one image for another, size, color, font, text style, placement or location displayed in the user interface, or any other configurable visual properties of an object that may be displayed in a user interface of an application.

Advantageously, by utilizing the above techniques, visual elements appearing on the user interface of application 220 may be updated dynamically at runtime, while still preserving system integrity. By creating the copy of the code block and modifying that copy instead of the original code block, system crashes due to memory access errors and stack violations may be prevented. For example, if the original code block is loaded onto a stack somewhere in memory, that stack remains valid and will not crash upon returning through the original code block or from a stack trace. Further, if the original code block was optimized via a JIT compiler, the original code block is still valid, except that due to the modification to the pointer in the original code block to jump to the trampoline function, the code block now jumps to the trampoline function instead of calling the optimized native code generated by the JIT compiler. Thread safety is also ensured with the above techniques, because the changes to the copy of the code block occur prior to setting the pointer in the original code block to jump to the trampoline function, so the problem of a thread potentially accessing a location in memory while that same area of memory is being modified in another thread is averted. Another exemplary operation of computing system 201 to facilitate modifications to program execution in an application at runtime will now be discussed with respect to FIG. 4.

FIG. 4 is a sequence diagram that illustrates an operation of computing system 201 in an exemplary implementation. In this example, application modification SDK 222 is utilized to swizzle portions of application code associated with application 220. However, although the sequence diagram describes a process to swizzle an application function of application 220, note that the following techniques could be utilized on any method or program code, including OS runtime native methods 231 or any other OS methods, objects, or libraries.

For purposes of exposition, this example assumes that the OS 210 installed on computing system 201 comprises an Android operating system, which includes an Android Runtime (ART) application runtime environment with ART native methods, represented in this example by runtime system 230 and OS runtime native methods 231, respectively. Application modification SDK 222 is installed into application 220, which in this example comprises a Java application running on an ART runtime environment.

Initially, one or more of the OS runtime native methods 231 load the Java bytecode version of the application function and its associated ArtMethod code block into memory system 203. Note that most or all of application 220 would typically be loaded into memory upon execution, but only the application function being swizzled here is shown in the sequence diagram for clarity.

Once the application function and the ArtMethod object that represents the function at runtime are in memory, SDK 222 creates a copy of the original ArtMethod code block and stores the copy as a new object called ArtMethodInterpretive. SDK 222 modifies flags, metadata, and other call processing code of ArtMethodInterpretive to call the interpreter to run the Java bytecode version of the function, instead of native code if the function was optimized. The modifications to ArtMethodInterpretive ensure that any subsequent calls to ArtMethodInterpretive will cause the Java bytecode version of the function to run on the interpreter, instead of a native machine code version of the function which may exist due to JIT translation optimization or otherwise.

After creating and modifying ArtMethodInterpretive, SDK 222 creates another copy of the original ArtMethod code block of the function and stores the copy as a new object called ArtMethodNative. SDK 222 modifies flags, metadata, and other call processing code of ArtMethodNative to call custom native code. For example, the ArtMethodNative copy of the ArtMethod code block may be modified to call a Java Native Interface (JNI) method that is configured to call the bytecode version of the swizzled method via the modified ArtMethodInterpretive code block, and can take other actions as appropriate. In some implementations, the modifications to the ArtMethodNative copy of the ArtMethod code block may include setting a flag in ArtMethodNative to mark the ArtMethodNative code block as having a native code version of the method, and also modifying metadata in the ArtMethodNative block to identify the custom JNI method that should be run instead of the actual native code version of the method when the native code version of the method is invoked via ArtMethodNative.

After creating and modifying the copies of the ArtMethod block, SDK 222 modifies the entryPointFromQuickCompiledCode pointer in the original ArtMethod to jump to a custom trampoline function. This modification ensures that any calls to run the function via the original ArtMethod code block are instead routed to the custom trampoline function for handling. SDK 222 also swizzles the ART runtime method art::Jit::Jit::CanInvokeCompiledCode to instead run alternative call handling code configured to return 'true' if the ArtMethod of the function has been modified. For example, SDK 222 could keep track of which ArtMethod blocks are associated with application functions that have been modified in a list of swizzled functions, which may return a Boolean value indicating whether or not a particular function is included in the list. Accordingly, in the swizzled art::Jit::Jit::CanInvokeCompiledCode ART runtime method, the called function may be sent as a parameter to the art::Jit::Jit::CanInvokeCompiledCode method, and the called function parameter could be checked against this list of swizzled ArtMethod objects to determine whether or not the called function is among the swizzled ArtMethods, and a value of 'true' is returned if so. Otherwise, if the called function is not in the list of swizzled ArtMethods, the called function is allowed to run normally.

A call is made to the swizzled application function by referencing the entryPointFromQuickCompiledCode pointer in the original ArtMethod associated with the function. However, because the entryPointFromQuickCompiledCode in the original ArtMethod was modified to instead point to the trampoline function, the trampoline function is invoked instead of the application function. When the trampoline function runs, the trampoline functions checks if the ArtMethod of the application function was modified. For example, SDK 222 could keep track of which ArtMethod blocks are associated with application functions that have been modified in a list of swizzled functions, which can return a Boolean value indicating whether or not a particular function is included in the list. Accordingly, when the custom trampoline function is called, the trampoline function could query the list of swizzled application functions with the identity of the called function. If the called function appears in the list or is otherwise associated with a modified ArtMethod, the trampoline function dynamically replaces the original ArtMethod to the ArtMethodNative copy and jumps to the entryPointFromQuickCompiledCode in the ArtMethodNative code block that was modified to call the custom native code. The custom JNI method then runs in place of the actual native code version of the method, which could take any desired actions and make various changes to user interface elements and other runtime modifications, and may also call the Java bytecode version of the function by calling the corresponding ArtMethodInterpretive code block that is configured to call the interpreter and run the Java bytecode version of the function. In the alternative, if the application function does not appear in the list of swizzled functions or is otherwise not associated with any modifications, then the trampoline function jumps to the artQuickToInterpreterBridge to call the interpreter to run the original Java bytecode of the application function.

The runtime modification techniques described in this example provide a more robust way of swizzling a Java application function in the ART runtime environment, providing the ability to dynamically update visual elements appearing on the user interface of application 220 at runtime while still preserving system integrity. By creating the ArtMethodNative copy of the ArtMethod code block and modifying that copy instead of the original ArtMethod, system crashes due to memory access errors and stack violations may be prevented. Further, functions that are optimized during runtime by JIT translation will still have a valid ArtMethod, except that the ArtMethod now jumps to the custom trampoline function for call handling instead of calling the optimized native code generated by the JIT compiler due to the modification to the ArtMethod's entryPointFromQuickCompiledCode pointer. Multithreading safety is also ensured with the above techniques, because the changes to the ArtMethodInterpretive and ArtMethodNative copies of the original ArtMethod occur prior to setting the entryPointFromQuickCompiledCode pointer in the original ArtMethod to jump to the custom trampoline function. Another exemplary operation that implements application runtime modifications will now be discussed with respect to FIG. 5.

FIG. 5 illustrates an example implementation 500 of dynamic user interface modifications. Implementation 500 involves an application 501 that includes a main program 503, a call handler 505, and update code 507. Implementation 500 also involves an operating system 511 that includes a function 513. Application 501 interacts with operating system 511 to drive user interface 515.

Application 501 is representative of any application suitable for installing on a computing device and integrating with a call handler and update code. Examples of application 501 include, but are not limited to, mobile applications that may be downloaded and installed from an app store, or that come pre-installed on a device. Other examples include any type of locally installed and executed application, no matter its origin or distribution channel. Other types of applications, such as desktop applications, streaming applications, browser applications, or any combination or variation thereof are also representative.

Update code 507 may be implemented as a single, discrete piece of code, or may be implemented using multiple discrete pieces of code. For example, update code 507 may include one or more logical parts that hook a method, while also including one or more other logical parts that call handler 505 checks with to determine if an object has been updated.

In some scenarios, call handler 505 and update code 507 may be provided by an entity other than the developer of application 501. Such third parties may develop tools that allow call handler 505 and update code 507 to be integrated with applications. In other scenarios, call handler 505 and update code 507 may be developed by the same entity that develops application 501 and may be developed in the context of application 501. In at least one implementation, call handler 505 and update code 507 may be software modules or components of an application modification SDK installed into application 501.

Update code 507 may be invoked at various times during program execution to update visual elements and other objects in the user interface in accordance with, for example, A/B testing constraints or any update constraints. Update code 507 may periodically (or at some other interval) communicate with a testing service situated remotely from the device on which update code 507 runs. Call handler 505 may be "hooked" into a function 513 of operating system 511, such that when the function 513 of operating system 511 is called, call handler 505 is executed instead of the native machine code of function 513.

In this example, the function 513 of operating system 511 is responsible for retrieving an object or objects for presentation in the user interface 515, which may occur when a user navigates to a new view that requires loading of new objects that were not previously in view. Accordingly, in operation, an element in operating system 511 initiates a call into function 513 to obtain an object for display in user interface 515. This may occur in response to user input, such as a scroll, click, or other such navigation.

When the scrolling or other user input occurs, operating system 511 calls the method responsible for loading the objects, which is function 513 in this example. However, in this example the function 513 is a hooked (or swizzled) function such that when the function 513 is called, call handler 505 is invoked instead of the actual code implementation of the hooked function 513. Function 513 may be hooked, or swizzled, according to the techniques disclosed herein by making multiple copies of a code block runtime object associated with function 513, such as an ArtMethod object in an ART environment as discussed in some examples, and modifying one of the copies to call the interpreter to run a bytecode version of function 513, and modifying another copy to call alternative code comprising call handler 505 and update code 507 in this example. Thus, when a trampoline function calls the copy of the code block that has been modified to call the alternative code as described above in operation 300, the alternative code runs as the call handler 505 in this example, which calls the copy of the code block to invoke the bytecode version of function 513 so that the object can be retrieved, as shown in step 3 of implementation 500. The bytecode implementation of function 513 runs to obtain the requested object, as shown in step 4. However, because call handler 505 invokes the bytecode version of function 513, control returns to call handler 505 after the bytecode version of function 513 has executed.

Thus, with the object retrieved from persistent storage or memory by running the bytecode version of function 513, control is returned to call handler 505. Call handler 505 then calls into update code 507 to determine whether or not the object's visual appearance should be modified. Update code 507 determines whether or not the retrieved object is subject to an update (an A/B test, for instance). For example, update code 507 may determine whether or not the color, size, font, position, or other visual characteristics of the object should be changed in accordance with an update.

Assuming a visual characteristic of the retrieved object should be changed, update code 507 instructs call handler 505 what properties of the object to change. Call handler 505 implements those changes dynamically in memory, such as by changing the color of the object or the like. When call handler 505 has completed the modifications to the object, call handler 505, having been invoked when the operating system 511 called the hooked function 513, returns control to the operating system 511. The operating system 511 then proceeds to render the object in the user interface 515 accordingly, with the changed color or other appearance modification. In this manner, visual elements appearing on the user interface 515 may be dynamically updated at runtime, without causing memory errors or system crashes.

Turning now to FIG. 6, a block diagram of communication system 600 is illustrated. Communication system 600 includes mobile device 601, computing system 603, communication network 630, and application modification server 640. Mobile device 601 includes operating system 620 and application 610. Application 610 runs on operating system 620. Mobile device 601 may also include a user interface that communicates with operating system 620 over a bus communication device. Application 610 comprises main program 611 and application modification software development kit (SDK) 612, which may be implemented as different software modules of application 610. Main program 611 comprises the primary program instructions for the functionality of the application, such as streaming video, social networking, email, instant messaging, weather, navigation, or any other mobile application. Application modification SDK 612 may be installed into application 610 to facilitate changes and updates to a user interface and other visual elements of the application 610, perform A/B testing of different application design variants, and other functionality. In some examples, application modification SDK 612 could comprise an embedded control module of application 610. Computing system 603 includes application editor 613. Computing system 603 may also include an operating system and user interface, although these components are not shown for clarity. Application modification server 640 comprises a computing system that provides an application development and optimization platform. In some examples, application editor 613 may comprise a web browser application that loads the application development and optimization platform provided by application modification server 640.

In operation, a developer of application 610 may execute application editor 613 on computing system 603 to operate an application management dashboard to apply real-time changes and updates to a user interface and other visual elements of the application 610, activate or deactivate features, perform A/B testing of different application design variants to determine how changes to application 610 affect user behavior, customize the application 610, modify web content displayed within a webview, and other functionality. The developer may execute application 610 on mobile device 601 for use as a test device, and the execution of application 610 would then be mirrored in the visual editor 613 executing on computing system 603. The mirrored execution of application 610 within application editor 613 is achieved by application modification SDK 612 transferring screenshots of the application 610 to computing system 603 for display within the editor 613, which may communicate over web sockets. SDK 612 sends information about the user interface of application 610 to computing system 603 for display within application editor 613, including the entire view hierarchy of application 610, which comprises descriptions or labels of all views that exist in the current interface and screenshots of the views. In this manner, the screenshots of the views can be displayed as images on the screen within the visual application editor 613, and the view descriptions, labels, and any other information may be displayed in a tree structure or tree diagram that represents the view hierarchy structure in a graphical form.

Once the visual application editor 613 receives and displays the view hierarchy of application 610, the developer can then click through the various views within the view hierarchy and make changes to different visual elements of the user interface. These changes are then sent to the application modification server 640 which can instantly update the display of application 610 with the changes in real-time on mobile device 601 via communication with application modification SDK 612. Similarly, other application management functionality of the visual application editor 613 may be created and communicated to application modification server 640 and subsequently deployed to application 610 on mobile device 601 by communicating with SDK 612. Of course, any of the functionality described herein could be applied to numerous instances of application 610 installed on multitudes of user mobile devices which may affect some or all of the entire user base, but only one mobile device 601 is shown in FIG. 6 for clarity.

Still referring to FIG. 6, mobile device 601 comprises a processing system and communication transceiver. Mobile device 601 may also include other components such as a user interface, data storage system, and power supply. Mobile device 601 may reside in a single device or may be distributed across multiple devices. Examples of mobile device 601 include mobile computing devices, such as cell phones, tablet computers, laptop computers, notebook computers, and gaming devices, as well as any other type of mobile computing devices and any combination or variation thereof. Examples of mobile device 601 may also include desktop computers, server computers, and virtual machines, as well as any other type of computing system, variation, or combination thereof.

Computing system 603 comprises a processing system and communication transceiver. Computing system 603 may also include other components such as a user interface, data storage system, and power supply. Computing system 603 may reside in a single device or may be distributed across multiple devices. Examples of computing system 603 include mobile computing devices, such as cell phones, tablet computers, laptop computers, notebook computers, and gaming devices, as well as any other type of mobile computing devices and any combination or variation thereof. Examples of computing system 603 also include desktop computers, server computers, and virtual machines, as well as any other type of computing system, variation, or combination thereof.

Communication network 630 could comprise multiple network elements such as routers, gateways, telecommunication switches, servers, processing systems, or other communication equipment and systems for providing communication and data services. In some examples, communication network 630 could comprise wireless communication nodes, telephony switches, Internet routers, network gateways, computer systems, communication links, or some other type of communication equipment, including combinations thereof. Communication network 630 may also comprise optical networks, packet networks, local area networks (LAN), metropolitan area networks (MAN), wide area networks (WAN), or other network topologies, equipment, or systems, including combinations thereof. Communication network 630 may be configured to communicate over metallic, wireless, or optical links. Communication network 630 may be configured to use time-division multiplexing (TDM), Internet Protocol (IP), Ethernet, optical networking, wireless protocols, communication signaling, or some other communication format, including combinations thereof. In some examples, communication network 630 includes further access nodes and associated equipment for providing communication services to several computer systems across a large geographic region.

Application modification server 640 may be representative of any computing apparatus, system, or systems that may connect to another computing system over a communication network. Application modification server 640 comprises a processing system and communication transceiver. Application modification server 640 may also include other components such as a router, server, data storage system, and power supply. Application modification server 640 may reside in a single device or may be distributed across multiple devices. Application modification server 640 may be a discrete system or may be integrated within other systems, including other systems within communication system 600. Some examples of application modification server 640 include desktop computers, server computers, cloud computing platforms, and virtual machines, as well as any other type of computing system, variation, or combination thereof.

Referring now to FIG. 7, a block diagram that illustrates computing system 700 in an exemplary implementation is shown. Computing system 700 provides an example of mobile device 110, computing system 201, mobile device 601, computing system 603, application modification server 640, or any computing system that may be used to execute runtime modification process 300 or variations thereof, although such systems could use alternative configurations. Computing system 700 includes processing system 701, storage system 703, software 705, communication interface 707, and user interface 709. Software 705 includes application 706 which itself includes runtime modification process 300. Runtime modification process 300 may optionally be implemented separately from application 706 as indicated by the dashed lines surrounding process 300 in FIG. 7.

Computing system 700 may be representative of any computing apparatus, system, or systems on which application 706 and runtime modification process 300 or variations thereof may be suitably implemented. Computing system 700 may reside in a single device or may be distributed across multiple devices. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for each implementation or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer-readable storage media capable of storing software 705 and readable by processing system 701. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 709, processing system 701 loads and executes portions of software 705, such as runtime modification process 300, to facilitate modifications to program execution in an application at runtime as described herein. Software 705 may be implemented in program instructions and among other functions may, when executed by computing system 700 in general or processing system 701 in particular, direct computing system 700 or processing system 701 to create a copy of a code block associated with code. Software 705 may further direct computing system 700 or processing system 701 to modify a flag associated with the copy of the code block to mark the copy of the code block as having a native code version of the code. Software 705 may also direct computing system 700 or processing system 701 to modify metadata associated with the copy of the code block to identify alternative code to run instead of the native code version of the code when the native code version of the code is invoked. Further, software 705 may direct computing system 700 or processing system 701 to modify a pointer associated with the code block to point to a trampoline function instead of an original address, wherein, when the pointer associated with the code block is accessed, the trampoline function is invoked instead of the original address by virtue of the pointer modification. Software 705 may further direct computing system 700 or processing system 701 to, in the trampoline function, check whether the code block is associated with a modification, and when the code block is associated with the modification, then call the copy of the code block to invoke the alternative code by virtue of the flag and the metadata.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized to facilitate modifications to program execution in an application at runtime as described herein for each implementation or variations thereof. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-readable storage media are characterized as primary or secondary storage.

In some examples, if the computer-readable storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement application 706 and/or runtime modification process 300 to operate as described herein for each implementation (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 709. In some examples, user interface 709 could include a touch screen capable of displaying a graphical user interface that also accepts user inputs via touches on its surface. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface. User interface 709 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate modifications to program execution in an application at runtime, the method comprising:
    creating a copy of a code block associated with code;
    modifying a flag associated with the copy of the code block to mark the copy of the code block as having a native code version of the code;
    modifying metadata associated with the copy of the code block to identify alternative code to run instead of the native code version of the code when the native code version of the code is invoked;
    modifying a pointer associated with the code block to point to a trampoline function instead of an original address, wherein, when the pointer associated with the code block is accessed, the trampoline function is invoked instead of the original address by virtue of the pointer modification; and
    in the trampoline function, checking whether the code block is associated with a modification, and when the code block is associated with the modification, then calling the copy of the code block to invoke the alternative code by virtue of the flag and the metadata.

2. The method of claim 1 further comprising:
    creating a second copy of the code block associated with the code; and
    modifying second metadata associated with the second copy of the code block to invoke a bytecode version of the code when the second copy of the code block is called.

3. The method of claim 2 wherein, when the alternative code is invoked, the alternative code calls the second copy of the code block to invoke the bytecode version of the code by virtue of the second metadata.

4. The method of claim 3 wherein control returns to the alternative code after the bytecode version of the code executes.

5. The method of claim 4 wherein the bytecode version of the code retrieves an object for display in a user interface of the application, and wherein the alternative code, upon receiving control back after the bytecode version of the code executes, changes a characteristic of the object prior to display in the user interface of the application.

6. The method of claim 1 wherein modifying the metadata associated with the copy of the code block to identify the alternative code to run instead of the native code version of the code when the native code version of the code is invoked comprises modifying another pointer associated with the copy of the code block to point to the alternative code instead of the native code version of the code.

7. The method of claim 1 wherein modifying the metadata associated with the copy of the code block to identify the alternative code to run instead of the native code version of the code occurs prior to modifying the pointer associated with the code block to point to the trampoline function instead of the original address.

8. One or more computer-readable storage media having program instructions stored thereon to facilitate modifications to program execution in an application at runtime, wherein the program instructions, when executed by a computing system, direct the computing system to at least:
    create a copy of a code block associated with code;
    modify a flag associated with the copy of the code block to mark the copy of the code block as having a native code version of the code;
    modify metadata associated with the copy of the code block to identify alternative code to run instead of the native code version of the code when the native code version of the code is invoked;
    modify a pointer associated with the code block to point to a trampoline function instead of an original address, wherein, when the pointer associated with the code block is accessed, the trampoline function is invoked instead of the original address by virtue of the pointer modification; and
    in the trampoline function, check whether the code block is associated with a modification, and when the code block is associated with the modification, then call the copy of the code block to invoke the alternative code by virtue of the flag and the metadata.

9. The one or more computer-readable storage media of claim 8 wherein the program instructions further direct the computing system to create a second copy of the code block associated with the code and modify second metadata associated with the second copy of the code block to invoke a bytecode version of the code when the second copy of the code block is called.

10. The one or more computer-readable storage media of claim 9 wherein, when the alternative code is invoked, the alternative code calls the second copy of the code block to invoke the bytecode version of the code by virtue of the second metadata.

11. The one or more computer-readable storage media of claim 10 wherein control returns to the alternative code after the bytecode version of the code executes.

12. The one or more computer-readable storage media of claim 11 wherein the bytecode version of the code retrieves an object for display in a user interface of the application, and wherein the alternative code, upon receiving control back after the bytecode version of the code executes, changes a characteristic of the object prior to display in the user interface of the application.

13. The one or more computer-readable storage media of claim 8 wherein the program instructions direct the computing system to modify the metadata associated with the copy of the code block to identify the alternative code to run instead of the native code version of the code when the native code version of the code is invoked by directing the computing system to modify another pointer associated with the copy of the code block to point to the alternative code instead of the native code version of the code.

14. The one or more computer-readable storage media of claim 8 wherein the program instructions direct the computing system to modify the metadata associated with the copy of the code block to identify the alternative code to run instead of the native code version of the code prior to directing the computing system to modify the pointer associated with the code block to point to the trampoline function instead of the original address.

15. A computing apparatus to facilitate modifications to program execution in an application at runtime, the computing apparatus comprising:
   one or more computer-readable storage media;
   a processing system operatively coupled with the one or more computer-readable storage media; and
   program instructions stored on the one or more computer-readable storage media that, when executed by the processing system, direct the processing system to at least:
   create a copy of a code block associated with code;
   modify a flag associated with the copy of the code block to mark the copy of the code block as having a native code version of the code;
   modify metadata associated with the copy of the code block to identify alternative code to run instead of the native code version of the code when the native code version of the code is invoked;
   modify a pointer associated with the code block to point to a trampoline function instead of an original address, wherein, when the pointer associated with the code block is accessed, the trampoline function is invoked instead of the original address by virtue of the pointer modification; and
   in the trampoline function, check whether the code block is associated with a modification, and when the code block is associated with the modification, then call the copy of the code block to invoke the alternative code by virtue of the flag and the metadata.

16. The computing apparatus of claim 15 wherein the program instructions further direct the processing system to create a second copy of the code block associated with the code and modify second metadata associated with the second copy of the code block to invoke a bytecode version of the code when the second copy of the code block is called.

17. The computing apparatus of claim 16 wherein, when the alternative code is invoked, the alternative code calls the second copy of the code block to invoke the bytecode version of the code by virtue of the second metadata.

18. The computing apparatus of claim 17 wherein control returns to the alternative code after the bytecode version of the code executes.

19. The computing apparatus of claim 18 wherein the bytecode version of the code retrieves an object for display in a user interface of the application, and wherein the alternative code, upon receiving control back after the bytecode version of the code executes, changes a characteristic of the object prior to display in the user interface of the application.

20. The computing apparatus of claim 15 wherein the program instructions direct the processing system to modify the metadata associated with the copy of the code block to identify the alternative code to run instead of the native code version of the code when the native code version of the code is invoked by directing the processing system to modify another pointer associated with the copy of the code block to point to the alternative code instead of the native code version of the code.

* * * * *